US009767089B2

(12) United States Patent
Haines et al.

(10) Patent No.: US 9,767,089 B2
(45) Date of Patent: Sep. 19, 2017

(54) COLLECTING AND AUDITING STRUCTURED DATA LAYERED ON UNSTRUCTURED OBJECTS

(71) Applicant: Industrial Audit Corporation, Toronto (CA)

(72) Inventors: Adam Bruce Haines, Toronto (CA); Jeremy Alan Rasmussen, Orillia (CA); Eric Michael King, Toronto (CA)

(73) Assignee: Industrial Audit Corporation, Toronto (CA)

( * ) Notice: Subject to any disclaimer, the term of this patent is extended or adjusted under 35 U.S.C. 154(b) by 295 days.

(21) Appl. No.: 14/472,198

(22) Filed: Aug. 28, 2014

(65) Prior Publication Data

US 2016/0062973 A1    Mar. 3, 2016

(51) Int. Cl.
  *G06F 17/00*  (2006.01)
  *G06F 17/24*  (2006.01)

(52) U.S. Cl.
  CPC .................................. *G06F 17/243* (2013.01)

(58) Field of Classification Search
  CPC ...................................................... G06F 17/243
  See application file for complete search history.

(56) References Cited

U.S. PATENT DOCUMENTS

| | | | |
|---|---|---|---|
| 5,752,054 A | 5/1998 | Garber et al. | |
| 6,272,506 B1 * | 8/2001 | Bell | G06F 17/243 707/999.009 |
| 7,523,391 B1 * | 4/2009 | Eizenhoefer | G06F 3/04895 707/999.1 |
| 7,681,791 B1 * | 3/2010 | Beveridge | G06F 17/243 235/380 |
| 7,791,474 B2 * | 9/2010 | Saito | G06F 17/243 340/540 |
| 8,442,331 B2 * | 5/2013 | King | G06F 17/218 382/229 |

(Continued)

OTHER PUBLICATIONS

"Mobile Inspection Software," MSI Data Website, Available Online at http://www.msidata.com/mobile-inspection-software, Available as Early as Dec. 16, 2012, 5 pages.

(Continued)

*Primary Examiner* — Keith Bloomquist
(74) *Attorney, Agent, or Firm* — Alleman Hall Creasman & Tuttle LLP

(57) ABSTRACT

Various embodiments relating to collecting and auditing structured data layered on unstructured object are disclosed. In one embodiment, a field-data tracking form may include a plurality of input fields layered over an unstructured base object (e.g., a legacy form, document, image, diagram, etc.). Each input field may correspond to a different data object having attributes that maintain a full traceable history of changes made to the input field. The field-data tracking form may act as a data-entry vehicle that can be sent to mobile computers to allow field data to be entered directly into input fields corresponding to the data objects, while maintaining the visual layout of the unstructured base object. Furthermore, attributes of discrete data objects from different versions of the field-data tracking form may be searched and displayed via an audit viewing tool graphical user interface (GUI).

9 Claims, 7 Drawing Sheets

(56) References Cited

U.S. PATENT DOCUMENTS

| | | | | |
|---|---|---|---|---|
| 8,661,330 | B1* | 2/2014 | Kilat | G06F 17/243 |
| | | | | 715/224 |
| 8,856,676 | B1* | 10/2014 | Starenky | G06F 17/243 |
| | | | | 715/780 |
| 2006/0259483 | A1* | 11/2006 | Ozana | G06F 17/30861 |
| 2008/0027900 | A1* | 1/2008 | Dietrich | G06Q 10/00 |
| 2010/0185693 | A1* | 7/2010 | Murty | G06Q 10/06 |
| | | | | 707/803 |
| 2010/0251092 | A1* | 9/2010 | Sun | G06F 17/243 |
| | | | | 715/222 |
| 2011/0283177 | A1* | 11/2011 | Gates | G06F 17/243 |
| | | | | 715/224 |
| 2012/0089659 | A1* | 4/2012 | Halevi | G06F 17/243 |
| | | | | 709/201 |
| 2014/0101062 | A1 | 4/2014 | Beigel et al. | |
| 2014/0172513 | A1* | 6/2014 | MacLean | G06Q 30/018 |
| | | | | 705/7.39 |
| 2014/0304582 | A1* | 10/2014 | Bills | G06F 17/243 |
| | | | | 715/224 |
| 2015/0149877 | A1* | 5/2015 | Ling, III | G06F 17/243 |
| | | | | 715/221 |

OTHER PUBLICATIONS

"FieldAudit: Field-Based Auditing Software for Businesses," FieldAudit Website, Available Online at http://www/fieldaudit.com/, Available as Early as Aug. 13, 2013, 2 pages.

* cited by examiner

TASK MANAGING TOOL 128

| 400 | 402 | 404 | 406 |
|---|---|---|---|
| CREATE TASK TEMPLATE | EDIT TASK TEMPLATE | CREATE TASK INSTANCE | EDIT TASK INSTANCE |

| TASK | LOCATION | ASSIGNED TO | DUE DATE |
|---|---|---|---|
| INSPECTION 1 | DIFFUSER | ADAM | 1-13 |
| INCIDENT REPORT 1 | STEAM TURBINE | JENNIFER | 1-13 |
| INSPECTION 2 | GENERATOR | BRUCE | 1-13 |
| INSPECTION 3 | PIPELINE | ADAM | 1-14 |
| INCIDENT REPORT 2 | CONTROL ROOM | JENNIFER | 1-14 |
| INSPECTION 4 | TRANSFORMER | BRUCE | 1-14 |
| INSPECTION 5 | GAS TURBINE | ADAM | 1-14 |
| INCIDENT REPORT 3 | STORAGE TANK | JENNIFER | 1-15 |
| INSPECTION 6 | STORAGE TANK | BRUCE | 1-15 |

FIG. 4 ⬉ 408

FORM BUILDING TOOL 130

501 — INCIDENT REPORT — 510

512
- CLAIMANT: SELECT NAME 1 | NUMBER: TEXT INPUT 1
- DATE: TEXT INPUT 2 | TIME: TEXT INPUT 3
- CLAIMANT ACCOUNT: TEXT INPUT 4                         1
- WITNESS: SELECT NAME 2 | NUMBER: TEXT INPUT 5
- WITNESS ACCOUNT: TEXT INPUT 6                          2
- INSPECTOR SIGNATURE: SIGNATURE 1                       3
- SUPERVISOR SIGNATURE: SIGNATURE 2                      4

500 INSERT BASE OBJECT
502 ADD LAYER
504 ADD DATA OBJECT
506 DEFINE OBJECT ATTRIBUTES
508 DEFINE INTERACTION RULES

FIG. 5

COLLECTING AND AUDITING STRUCTURED DATA LAYERED ON UNSTRUCTURED OBJECTS

BACKGROUND

Organizations may collect data out in the field for various tracking and auditing purposes. For example, field data may provide an objective record of evidence that can be used for regulatory compliance, maintenance, quality control, safety observance, and tracking other operations. Traditionally, field data has been collected using physical documents, images, drawings, and forms that are filled out by hand in the field. Once the physical forms are filled out to collect the field data, the physical forms may be kept in a physical file, for example. In another example, the physical forms may be manually converted into digital records that are stored in a tracking computer. Such an approach for collecting field data may be largely inefficient, because the field data may not be easily extracted from the physical forms and transformed into digital records that can be tracked and audited. Moreover, filling out the physical forms by hand may be error prone. Further, transcribing the physical forms to digital records may add an additional step that can result in transcription errors.

Various attempts have been made to collect field data in a manner that is more accurate and efficient relative to the legacy forms that are filled out by hand. In one example, a physical form is replaced by a software application to collect field data. The software application presents a graphical user interface (GUI) having a question/answer format. In particular, input fields of the physical form may be extracted from the existing visual layout of the physical form and transformed into a series of questions. A field operator may provide answers to the questions to collect field data. The question/answer format may provide a standard input method that may be applied across different types of legacy forms.

Furthermore, the software application may be optimized for presentation on a mobile computer, such as a laptop, tablet, or smartphone that may be operated out in the field. Accordingly, field data may be directly collected in a digital format that may be more easily stored as digital records relative to a legacy physical form that is filled out by hand, and then transformed into a digital record.

However, in many cases, the visual layout of the legacy forms may play a significant role in the collection of field data. For example, the layout of physical forms used in the field may be approved by administrators as complying with policies, procedures, and standards of an organization or regulatory agency. In some cases, deviation from such visual layouts may result in a failure to comply with requirements for records management and retention. Accordingly, in some cases, field data collected using the above described question/answer format would have to be re-mapped into a custom output file that mirrors the visual layout of the legacy form in order to comply with such requirements. This additional step may reduce the efficiency gained by using the question/answer format to collect field data.

Furthermore, in some cases, the visual layout of a legacy form may remain unchanged for a substantial period of time, such that the visual layout is easily recognized by many experienced field operators. As such, converting the layout to a question/answer format may cause a barrier to adopting the software application to collect field data. In particular, field operators may be hesitant to switch formats, because the question/answer format may be less intuitive relative to the known quantity of the legacy form. Moreover, even if the question/answer format is adopted for collecting field data, efficiency of data collection may be reduced, at least temporarily, because the field operators may be less familiar with the visual layout of the question/answer format relative to the visual layout of the legacy form.

SUMMARY

The present disclosure seeks to address the above described issues of the previous approaches by providing systems and methods for capturing structured field data layered on unstructured objects. In one embodiment, a field-data tracking form may act as a data-entry vehicle that can be sent to mobile computers to allow field data to be collected on location out in the field. The field-data tracking form may include a plurality of input fields layered over an unstructured base object (e.g., a legacy form, document, image, diagram, etc.). Each input field may correspond to a discrete data object having a value and associated attributes. The field-data tracking form allows the collected field data to be directly associated with the discrete data objects, while maintaining the visual layout of the unstructured base object. In one example, the field-data tracking form may mirror the visual layout of a legacy physical form. Accordingly, the field-data tracking form may be easily adopted without a reduction in efficiency in collecting field data due to learning a different visual layout. Moreover, because the field data is stored as discrete data objects, the field data can be stored as auditable digital records without any additional transformation steps.

BRIEF DESCRIPTION OF THE DRAWINGS

FIG. 4 shows an example task managing tool graphical user interface (GUI).

FIG. 5 shows an example form building tool GUI.

DETAILED DESCRIPTION

The present disclosure relates to systems and methods for capturing structured field data visually layered on unstructured objects. In one example, structured field data may be defined as discrete data objects having specific values and associated attributes. The values of the data objects may be collected using input fields layered over an unstructured base object in a field-data tracking form. Furthermore, the attributes associated with the data objects may provide a fully traceable history of any changes made to the data objects.

It will be understood that the value of a data object may have any suitable data type and may take any suitable form. For example, a data object value may include a number, a character, a text string, a digital signature, an image, and other suitable data types. Likewise, it will be understood that an input field may take any suitable form to accommodate entry of a value. For example, an input field may include a text field, a pick list, an image capture prompt, a file attachment prompt, a signature line, and other suitable input fields.

It will be understood that any suitable attribute may be used to characterize a data object, input field, or value. In some cases, the data object attributes may provide information relating to a history of changes made to the data object. Such attributes may be referred to as audit attributes and may be used to provide auditing functionality of different versions of a field-data tracking form. In some implementations, the auditing attributes may track information relating to environmental conditions. For example, such attributes may track, weather conditions, altitude, ambient temperature, and other suitable environmental conditions of a geographic location. In some implementations, the auditing attributes may track information relating to an operator. For example, such attributes may track an operator's position, heart rate, temperature, pupil dilation, breathing rate, radiation exposure, and other suitable physical conditions. In some cases, such information may be provided by sensors included locally in an operator's computer or may be provided from any other suitable devices in communication (wired or wireless) with the operator's computer.

In some cases, the attributes may provide information relating to a position of a corresponding input field relative to the unstructured base object. This positional awareness of the input fields, may enable navigational user input functionality that is ubiquitous with mobile computers (e.g., touch input navigation of the input fields, touch input gestures, etc.).

In one example, the unstructured base object may be defined as a visual element that is not embedded with field data. It will be understood that the unstructured base object may take any suitable form. For example, an unstructured base object may include an image, a map, a diagram, a spreadsheet, a fixed-layout document (e.g., a legacy form), and other suitable visual elements.

Figure 1:
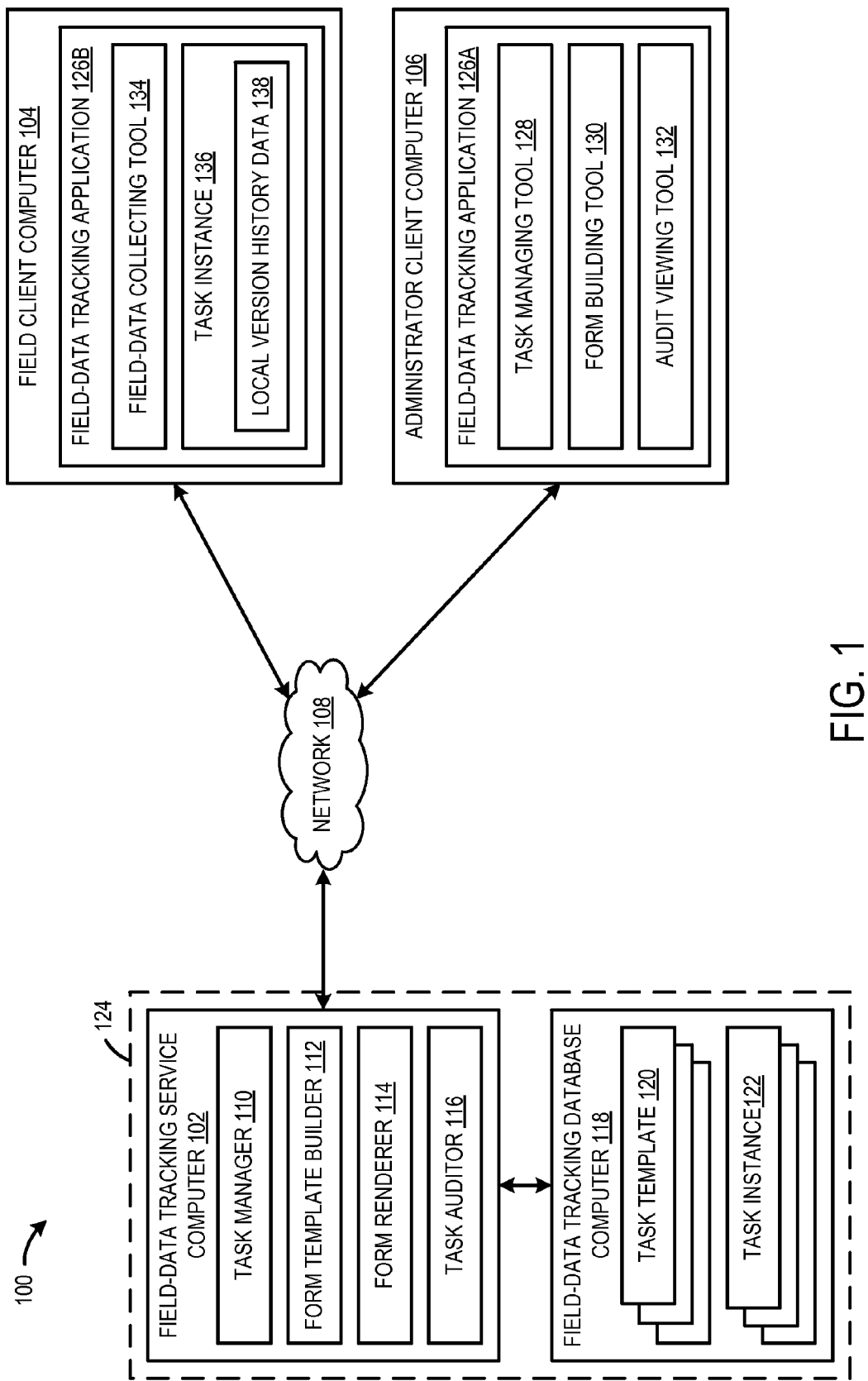
FIG. 1 shows an example field-data tracking computing system.

FIG. 1 shows an example field-data tracking system 100. The field-data tracking system 100 may enable collecting, tracking, and auditing of field data to provide an objective record of evidence. Such evidence can be used for regulatory compliance, maintenance, quality control, safety observance and tracking other operations. The field-data tracking system 100 may include a field-data tracking service computer 102 (referred to herein as the tracking service computer) configured to provide functionality relating to creating, distributing, storing, and auditing field-data tracking forms and associated field data. The tracking service computer 102 may be configured to communicate with a field client computer 104 and an administrator client computer 106 via a network 108, such as the Internet. It will be understood that the tracking service computer 102 may be in communication with any suitable number of field client computers and administrator client computers at any given time.

The field client computer 104 may be representative of any suitable computer that may be used by a field operator to collect field data. Typically, the field client computer may be a mobile computer, such as a laptop, tablet, or smartphone that can be carried by a field operator on location. In one example, field data may be collected using a mobile computer to fill out various incident reports. The incident reports may correspond to different incidents that occur at different locations. The mobile computer may be carried to the different locations by a field operator who is investigating the incidents in order to fill out the incident reports on location. Alternatively, in some cases, the field client computer may be placed in a fixed location, such as a workstation, to collect field data for that location. In one example, field data may be collected for a regularly occurring inspection of a particular location using a field client computer placed at the location.

The administrator client computer 106 may be representative of any suitable computer that may be used to manage the operation of the field-data tracking system 100. For example, an administrator client computer may be used to create, edit, and manage various tasks corresponding to different field-data tracking forms.

The field-data tracking system 100 may be a task-driven system, meaning that tasks may be created by administrators and assigned to field operators to be completed. In one example, an administrator may create task templates 120 for different tasks. Each task template may be applicable to a different type of task. A task template may act as a data structure or container that includes a field-data tracking form, interaction logic that defines an order in which field data is collected in the field-data tracking form, and other related data. The task data structure and associated logical components will be discussed in further detail below with reference to FIG. 2.

Each of the task templates 120 may be used repeatedly to complete a plurality of discrete task instances 122 of the same task type. Examples of different task templates corresponding to different task types may include an incident report, a safety inspection, a maintenance inspection, a compliance report, and other types of tasks. It will be appreciated that a task template may be created for any suitable type of task.

Furthermore, each time a new task instance 122 is created by an administrator, the task instance 122 may be assigned a distinct task instance identifier (e.g., a tracking number) that may be used to identify the task instance. Each new task instance may include a blank copy of a task template corresponding to the task type of the task instance. Once a task is assigned to a field operator, the task instance may be sent to the field operator so that the field-data tracking form included in the task instance may be populated with field data to complete the task.

In some cases, during the course of populating the field-data tracking form with field data, a value of one or more data objects may be changed, such as due to a data entry error, or the like. Each time a value of a data object is changed, a new version of the data object having different attributes is created within the field-data tracking form. Each version of the data object may have a distinct version identifier, so that each version of the data object may be identified and differentiated from other versions of the data object. In one example, all versions of a data object may be assigned identifiers that are sub-identifiers or extensions of a primary identifier of the data object.

Moreover, each time a value in the field-data tracking form is changed, a new version of the field-data tracking form may be created within the task instance. Each version of the field-data tracking form may have a distinct version identifier, so that each version may be identified and differentiated from other versions of the field-data tracking form. In one example, all versions of a field-data tracking form may be assigned identifiers that are sub-identifiers or extensions of a primary identifier of the field-data tracking form. Accordingly, different versions of field-data tracking forms and discrete objects within those versions may be individually identified and compared for auditing purposes.

The task templates 120 and the task instances 122 may be stored in a field-data tracking database computer 118. The field-data tracking database computer 118 may be in communication with the tracking service computer 102. Field data stored in the field-data tracking database computer 118 may be organized according to any suitable schema. In one example, each task instance may be associated with an individualized identifier, each field-data tracking form may be associated with an individualized identifier, and each data object may be associated with an individualized identifier. Accordingly, any suitable piece of field data may be identified and retrieved from the database for auditing purposes.

In some implementations, the field-data tracking database computer 118 and the tracking service computer 102 may be integrated into a single computer 124. In other implementations, the service and/or the database may be dispersed over a plurality of different computers, such as part of a cloud-computing implementation.

The tracking service computer 102 may be configured to manage tasks and provide related functionality to the field clients and administrator clients. To this end, the tracking service computer 102 may include a plurality of modules that each handle particular aspects of such functionality. In particular, tracking service computer 102 may include a task manager 110, a template builder 112, a form renderer 114 and a task auditor 116.

The task manager 110 may be configured to provide a task managing tool 128 to the administrator client computer 106. The task managing tool 128 may include a graphical user interface (GUI) that enables an administrator to create, edit, and manage task templates and task instances. In response to a task template 120 being created by an administrator, the task manager 110 may be configured to store the task template in the field-data tracking database computer 118. Likewise, in response to a task instance 122 being created by an administrator, the task manager 110 may be configured to store the task instance in the field-data tracking database computer 118. Further, the task manager 110 may be configured to associate a task instance identifier with the task instance in the database.

Furthermore, the task manager 110 may be configured to update a task template in the database responsive to the task template being edited by an administrator using the task managing tool 128. Likewise, the task manager 110 may be configured to update and/or create different versions of a task instance in the database responsive to field data in the task instance being changed by a field operator. Further, the task manager 110 may associate different version identifiers with each version of the task instance in the database.

The template builder 112 may be configured to provide a form building tool 130 to the administrator client computer 106. The form building tool 130 may include a GUI configured to enable an administrator to create a field-data tracking form by selecting an unstructured base object, creating different layers of input fields corresponding to discrete, structured data objects positioned visually overlaid on the unstructured base object. Each input field may have a designated position that is relative to the unstructured base object. In some implementations, the position of an input field may align with a physical counterpart of the unstructured base object. In one example, input fields may be layered over physical text entry fields of a legacy report.

Further, the form building tool 130 may be configured to enable the administrator to define attributes of each structured data object. In some implementations, the attributes may be automatically defined based on the type of data object.

In some applications, there may be a specific order in which operations are executed out in the field, and consequently an order that field data is collected (e.g., values need to be entered into the field-data tracking form) in order to comply with regulations or standards. This order may be referred to as procedural adherence. Accordingly, in some implementations, the form building tool 130 may be configured to enable the administrator to define interaction logic that places access restrictions on different layers of the field-data tracking form.

For example, interaction logic may be configured to restrict access to different layers of data objects until certain procedures or actions are performed. In one example, interaction logic may specify that all input fields in a layer must be filled out before access is granted to input fields in a next layer in a stack of layers. By configuring a field-data tracking form with interaction logic, procedural adherence may be maintained automatically without need for manual oversight. In contrast to the field-data tracking form, it is not possible to assure procedural adherence on strictly paper-based processes. Rather, it is left up to an organization to ensure that field operators are following the correct order of operations in the field through training and oversight. Such training and oversight may increase costs as well as reduce efficiency and productivity of an organization.

The form renderer 114 may be configured to provide a field-data collecting tool 134 to the field client computer 104. The field-data collecting tool 134 may include a GUI configured to display a field-data tracking form corresponding to a task instance 136. The field-data tracking form may include a plurality of layers visually overlaid on an unstructured base object. Each layer may include one or more data objects. Each data object may correspond to an input field located at a designated position relative to the unstructured base object.

The field-data collecting tool 134 may be configured to enable a field operator to select various input fields to enter values in those data fields to fill out the field-data tracking form. Further, the field-data collecting tool 134 may generate a plurality of attributes associated with a value entered into the input fields. The value and associated attributes may be stored in a data object corresponding to the input field. Example attributes may include a timestamp indicating when the value was entered in the input field, an author that entered the value in the input field, and a geographic location of the field client computer when the value was entered in the input field.

Furthermore, the field-data collecting tool 134 may be configured to enable a field operator to change values of input fields of the field-data tracking form. Because attributes are generated each time a value is entered in an input field and associated with the value in the data object, the attributes of the data object may be used to maintain a full traceable history of changes made to that data object.

Moreover, different values and associated attributes of a discrete data object may be stored as different versions of the data object. Each version of the data object may be distinctly identified as having a value and a set of associated attributes. The field-data collecting tool 134 may display a value from the latest version of a data object in the field-data tracking form, and the previous versions may be stored as local version history data 138. In other words, the values of the previous versions of the data object may be deactivated from being displayed, but the previous values and associated attributes may still maintained and accessible for auditing purposes.

In some implementations, the field-data collecting tool 134 may be configured to restrict access to input fields included in layers based on interaction logic of the field-data tracking form. In one example, access is restricted to input fields in all layers other than a current layer while not all input fields in the layer have been filled out with values. Further, in response to values being entered into each input field included in the current layer, access to input fields included in another layer (e.g., a next layer in a stack) of the field-data tracking form is granted.

The task auditor 116 may be configured to provide an audit viewing tool 132 to the administrator client computer 106. The audit viewing tool 132 may include a GUI configured to enable an administrator to select one or more versions of a field-data tracking form corresponding to a task instance to be displayed. For example, the audit viewing tool 134 may be configured to enable the administrator to retrieve a most current version as well as any other previous versions of a field-data tracking form. In another example, the audit viewing tool 134 may be configured to enable the administrator to compare multiple versions of a field-data tracking form associated with the same task instance. In another example, the audit viewing tool 134 may be configured to enable the administrator to compare multiple versions of a field-data tracking form associated with different task instances of the same task type. In another example, the audit viewing tool 134 may be configured to enable the administrator to scroll through each version of a field-data tracking form corresponding to a selected task instance.

Furthermore, the audit viewing tool 134 may be configured to enable the administrator to compare multiple versions of individual data objects in the GUI. In particular, different versions of values and associated attributes of a selected data object may be displayed in the GUI.

In some implementations, the audit viewing tool 134 may be configured to receive various search criteria for auditing different versions of task instances or individual data objects. In one example, the audit viewing tool 134 may include a date search filter that displays all changes made in one or more field-data tracking forms within a specified date range provided by the administrator. In another example, the audit viewing tool 134 may include a search filter that displays all changes made to field-data forms of task instances that fit search criteria (e.g., task instances of a designated type) provided by the administrator. In another example, the audit viewing tool 134 may include a search filter that displays changes made to data objects that fit search criteria (e.g., data objects of a designated type) provided by the administrator.

In some implementations, the tracking service computer 102 may provide access to task templates, task instances, field data, and related management functionality to the administrator client computer 106 via a field-data tracking application 126A. Likewise, the tracking service computer 102 may provide access to task instances and associated field-data tracking forms and related functionality to the field client computer 104 via a field-data tracking application 126B.

In some implementations, the field-data tracking application 126A may be referred to as a rich client that includes additional features relative to the field-data tracking application 126B, which in some cases may be referred to as a mobile client. For example, the field-data tracking application 126A may include tools for creating and editing task templates including field-data tracking forms, creating and managing task instances, and auditing field data. In some implementations, such tools may not be included in the field-data tracking application 126B. On the other hand, the field-data tracking application 126B may act as a field data entry vehicle to collect field data in different field-data tracking forms for different task instances.

Furthermore, in some implementations, the field-data tracking application 126B may be mobile-optimized such that a GUI may be formatted for a display of a handheld computer, such as a tablet computer. For example, the mobile-optimized field client may have a GUI that includes larger navigation buttons, simplified navigation, reformatted and/or reduced content, and differently optimized images relative to the rich client. In other implementations, the field-data tracking application 126A and the field-data tracking application 126B may include the same features, appearance, or may be optimized in the same manner.

In some implementations, the field client computer 104 may connect asynchronously with the tracking service computer 102. For example, the field client computer 104 may operate in an offline mode or and online mode. In the offline mode, the field data collected via the field-data collecting tool 134 for the task instance 136 may be stored locally on the field client computer 104 as the local version history data 138. It will be understood that field data for any suitable number of task instances may be stored locally on the field client computer. Further, the field client computer 104 may operate in an online mode in which the field client computer may asynchronously connect with the tracking service computer 102 to send the task instance 136 to be stored in the field-data tracking database computer 118. Such an implementation may be suitable for applications where field operators work in remote locations that may have sparse connectivity.

In other implementations, the field client computer 104 may be continuously connected to the tracking service computer 102, and field data entered into the field-data tracking form may be sent directly to the field-data tacking service to be stored in the field-data tracking database computer 118. In one example, the field-data tracking application 126B may be a web client application that is served by the tracking service computer 102 to the field client computer 104.

Figure 2:
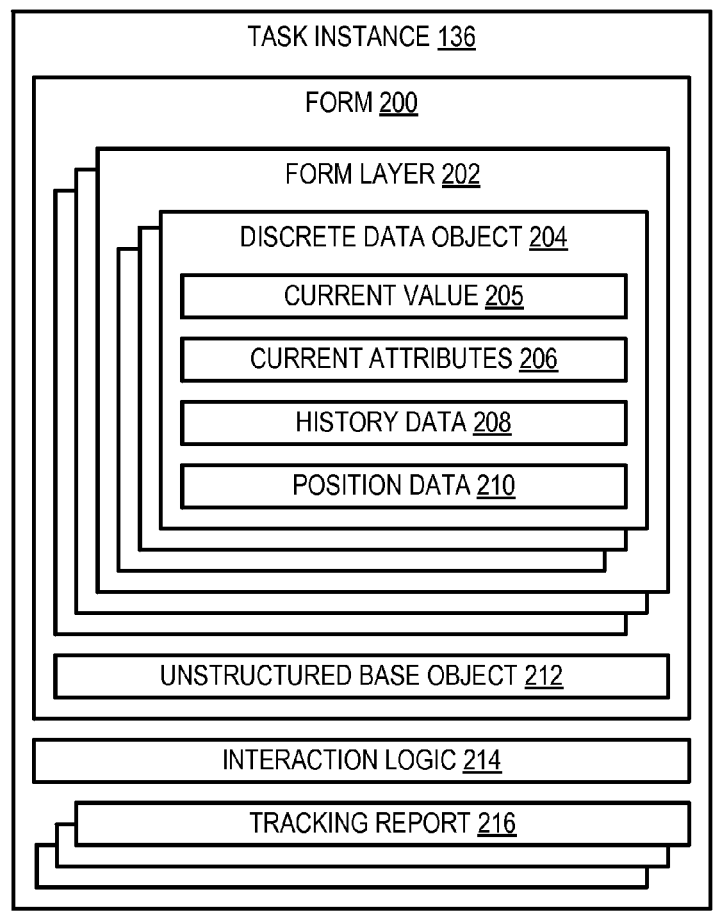
FIG. 2 shows an example instance of a task that is tracked using a field-data tracking form.

FIG. 2 shows an example task instance 136 that may be implemented in the field-data tracking system 100. The task instance 136 may act as a container to hold field data. In particular, the task instance 136 may include a field-data tracking form 200. The field-data tracking form 200 may include a plurality of layers 202 stacked over an unstructured base object 212. Each layer may include one or more discrete data objects 204 each corresponding to an input field. Each data object 204 may have a current value 205, current attributes 206 associated with the current value 205, history data 208, and position data 210.

The current value 205 may be the most recent value entered into the input field corresponding to the data object. The current attributes 206 may be generated based on the current value 205. For example, the attributes may include a timestamp indicating when the value was entered into the input field, an author that entered the value into the input field, and a geographic location where the value was entered into the input field. It will be understood that any suitable attribute may be generated based on the value. For example, different types of values may be have different types of attributes.

The history data 208 may include previous values entered into the input field corresponding to the data object and attributes associated with each previous value. For example, a field operator may enter a value into an input field while filling out the field-data tracking form. Then at a later time, the field operator may realize that the value was incorrect. The field operator may edit the field-data tracking form to input a new value in place of the incorrect value. In response to the change in value, new attributes may be generated and associated with the new value. Moreover, a new version of the data object and a new version of the field-data tracking form may be generated responsive to the value being updated. The new version of the data object and the new version of the field-data tracking form each may be assigned distinct identifiers so that different versions may be distinguished from other versions to create an audit trail. The new value may be displayed in the new version of the field-data tracking form, and the incorrect value and the associated attributes may be maintained in the history data 208. In other words, the current data and the history data may collectively represent a history of all changes made to the data object in different versions of the field-data tracking form.

In some implementations, information entered into a field-data tracking form may only be edited by an authorized user (e.g., either an operator or an administrator). For example, the field-data tracking form may include interaction rules that only allow a person with proper qualifications to make edits to information entered into the field-data tracking form. Moreover, such changes may be tracked and maintained as part of the history data of the data object in order to maintain a full audit trail. In some implementations, a list of qualified users may be maintained by an administrator, and such functionality may be provided via the task managing tool 128.

The position data 210 may include positional coordinates of a corresponding input field. The positional coordinates may be defined relative to the unstructured base object 212. In some implementations, each input field may be located at a designated position corresponding to a different region of interest of the unstructured base object.

In one example where the unstructured base object is a map, the regions of interest on the map may correspond to designated locations on the map. In one particular example, the field-data tracking form may be an inspection report used by an inspector to maintain a record that the inspector performed inspections at different locations on a map. The field-data tracking form may include input fields that require the inspector's digital signature to sign-off that the inspector inspected the locations. Each input field may be located at different locations to be inspected on the map.

In another example, where the unstructured base object is a fixed-layout document, the regions of interest may include text input fields of the fixed-layout document. By defining the position of the data object 204 relative to the unstructured base object 212, input fields corresponding to data objects may be aligned on top of real-world counterparts within the unstructured base object. Accordingly, a visual layout of the field-data tracking form 200 may be consistent with the visual layout of the unstructured base object 212.

Furthermore, the position data 210 may define a layer in which the data object 204 is located. In some implementations, the position data 210 may provide positional awareness of other data objects in the field-data tracking form 200. For example, the position data 210 may enable the data objet 204 to have an awareness of other data objects located in the same layer. In one example, every data object in every layer may have a multidimensional position. For example, every data object in every layer may have an X, Y, Z coordinate (or temporal awareness, as another example). Such multidimensional positional awareness may allow for navigation (e.g., zooming in/out) to particular data objects while maintaining a relative position and/or size of other data objects. For example, if a user zooms in on a particular data object, then other data objects within a viewable area may change in size and position according to the level of zoom.

The unstructured base object 212 may include any suitable visual element. For example, the unstructured base object may include an image, a map, a diagram, a fixed-layout document, or another suitable visual element. In some implementations, the unstructured base object may include real-world input fields, such as text fields that may be filled-out by hand in the case of a legacy form. In the field-data tracking form, input fields may be positioned on top of those real-world input fields to maintain a consistent visual layout. In other implementations, the unstructured base object may not include any real-world input fields, and the input fields corresponding to the data objects may be placed on top of various regions of interest on the unstructured base object. In other implementations, the input fields may be placed on top of various arbitrary locations on the unstructured base object.

The task instance 136 may include interaction logic 214 that defines rules for how values may be entered into input fields. For example, the interaction logic may be configured to restrict access to various input fields until specific criteria are met. In some implementations, the interaction logic may specify an order in which input fields in the field-data tracking form may be populated with values. In one example, the interaction logic may restrict access to a first input field until a value is entered into a second input field. In response to the second input field being filled out, the interaction logic may allow access to the first input field.

In another example, the interaction logic may restrict access to input fields included in layers other than a current layer. Further, in response to receiving a value in each input field included in the current layer, the interaction logic may allow access to input fields included in another layer of the plurality of layers of the field-data tracking form. In an implementation where layers are stacked, access may be allowed to input fields in the next layer in the stack.

In some implementations, one or more layers may be divided into a plurality of sections. Accordingly, beyond restricting access between layers, the interaction logic may be configured to restrict access between sections within a single layer. For example, within a layer, one section of the layer may have controlled access based on data input into a data field within the same layer, or on a different layer. In such implementations, access to different sections within a single layer may be controlled as well as access between different layers.

In some implementations, the interaction logic may use data received from an external sensor or computer as an input, and may control access to layers or sections of layers based on the inputs from these external sensors/devices. For example, a section or layer may be accessed based on receiving a fingerprint or retinal scan of an operator that is authorized to access the section or layer. Any suitable external sensor data may be used to control access to a section or layer of the field-data tracking form.

It will be understood that the interaction logic may include any suitable rules and restrictions for controlling access to input fields in various sections and layers in the field-data tracking form.

In some implementations, a field-data tracking form may not have any interactions rules, and all input fields may be included in a single layer positioned on top of the unstructured base object.

The task instance 136 may include one or more field-data tracking reports 216 in which values of data objects 204 in the field-data tracking form are flattened onto the unstructured base object 212 to produce a static output file that acts as a record of a completed task. Unlike the data objects, the data in the tracking reports 216 may not be edited once the report is created, in order to provide a snapshot of a particular state of the field-data tracking form. Different versions of the tracking report may be generated with different values, but each version of the tracking report may be distinguished (e.g., via a timestamp, serial number, etc.) from other versions of the tracking report. In some cases, such tracking reports may be used to provide objective evidence that a task has been completed in order to maintain compliance.

In some implementations, a tracking report may be generated in response to the field-data tracking form being fully completed with a value being entered into an input field corresponding to each data object. In some implementations, a tracking report may be generated when the field client computer 104 synchronizes with the field-data tracking service computer 102. In some implementations, a tracking report may be generated manually via a user input command. In other embodiments, a tracking report may be generated responsive to another suitable trigger event.

Figure 3:
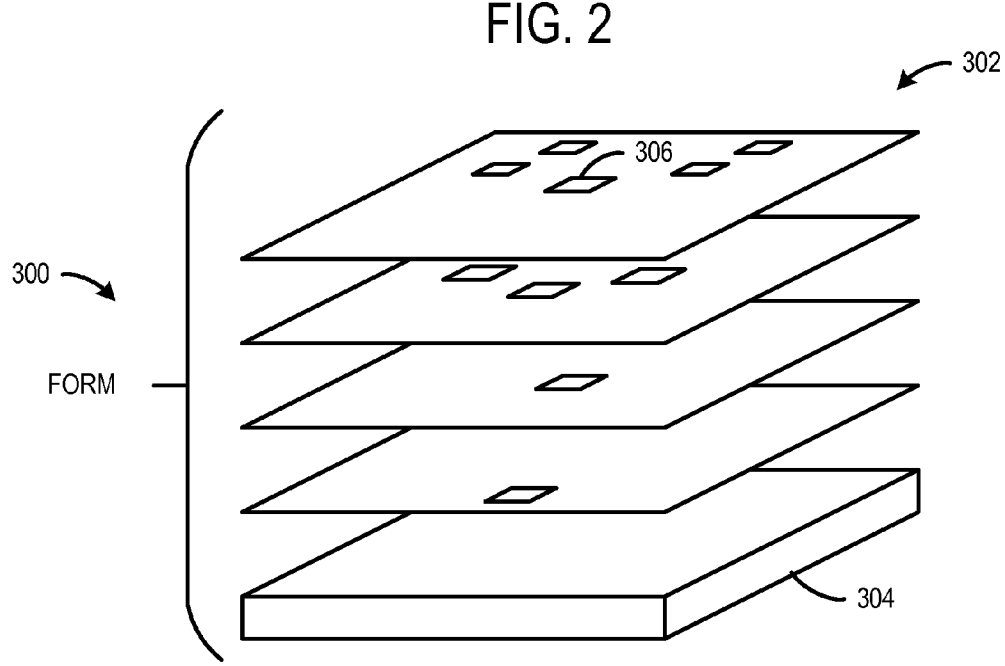
FIG. 3 shows an example field-data tracking form including a plurality of different layers overlaid on an unstructured base object.

FIG. 3 shows an example field-data tracking form 300 including a plurality of different layers 302 overlaid on an unstructured base object 304. Each of the layers 302 may include one or more input fields 306 corresponding to discrete data objects. Each input field 306 may be positioned within a layer to correspond to a designated position or region of interest on the unstructured base object 304. In some implementations, one or more layers may be further divided into different sections. Further, different sections may include different numbers of input fields.

In one example, the input fields may be organized into the different layers based on interaction logic, and further the plurality of layers may be stacked in a designated order based on the interaction rules. In some implementations, the interactions logic may further control access to different sections within a single layer. In one particular example, when the form is blank, the input fields in the top layer of the stack may be accessible, and access to the input fields in the lower layers may be restricted. When the input fields in the top layer are filled, access may be allowed to input fields in the next layer in the stack. The interaction logic may carry on the same restrictions throughout the stack, such that only input fields in a current layer (and higher layers in the stack) are accessible until all input fields in the current layer are filled out.

Although the field-data tracking form 300 is illustrated as a single page or unstructured base object, it will be appreciated that a field-data tracking form may include any suitable number of pages or unstructured base objects. For example, a field-data tracking form may include a plurality of pages or a plurality of unstructured base objects. In one example, a single legacy form that acts as an unstructured base object may comprise a plurality of pages having different layers that span the different pages.

Furthermore, in some implementations, a layer or section of a layer may span a plurality of pages or unstructured base objects. For example, one multidimensional layer may span three pages of a field-data tracking form. In this case, a flattening of the layer, such as when a report is created may generate a three page report because the layer spans three pages. Moreover, interaction logic may control access within such a layer across different pages or unstructured base objects. For example, providing a value to an input field on one page may allow access to an input field on another page.

FIG. 4 shows an example task managing tool GUI 128. For example, the task managing tool GUI 128 may be displayed at an administrator client computer to enable an administrator to create and manage task templates and task instances. The task managing tool GUI 128 may include a create-task-template selector 400, an edit-task-template selector 402, a create-task-instance selector 404, and an edit-task-instance selector 406.

The create-task-template selector 400 may be selected to initiate creation of a new task template. By selecting selector 400, the field-data tracking form building tool GUI 130 (shown in FIG. 5) may be displayed to build out a new field-data tracking form to be included in the task template. In addition to building out the field-data tracking form, the create-task-selector 400 may include functionality to define a task type of the task template as well as other attributes of the task template. Once a task template is created, the task template may be available to be selected for use in a task instance. In other words, copies of the task template may be used for numerous task instances associated with the task template.

The edit-task-template selector 402 may be selected to initiate editing of an already created task template. Any suitable data object, attribute, layer, section, base object, interaction rule, or other suitable aspect of a task template may be added, removed, or changed using selector 402. For example, a task template may be edited to accommodate a change in a task. In one example, a task may change to correspond with a change in policies, regulations, or standards.

The create-task-instance selector 404 may be selected to initiate creation of a new task instance. During creation of a task instance, various attributes of the task instance may be defined. For example, attributes that may be defined for a task instance may include a task title, a task type, a task template, a location of the task, a field operator assigned to complete the task, a deadline to complete the task, and other suitable attributes. When a new task instance is created, the task instance may be displayed in a task log 408. The task log 408 may display all currently active tasks and associated attributes to an administrator. Accordingly, the administrator may manage all task instances from one virtual location.

The edit-task-instance selector 406 may be selected to initiate editing of an already created task instance. Any suitable attribute of the task instance may be changed using selector 402. Further, the edit-task-instance selector 406 may be used to remove a task instance from the task log 408 once the task instance is completed or becomes inactive. In one example, a task instance may be edited responsive to a task being reassigned to another field operator. In another example, a task instance may be edited responsive to a deadline of the task instance being changed.

In the depicted implementation, the task managing tool is being used to manage tasks related to operation of a liquid natural gas (LNG) refinery. More particularly, the tasks relate to safety and maintenance of the LNG refinery. The tasks may be performed to comply with safety regulations and maintenance policies of the LNG industry. The task instances shown in the task log include two task types— inspections and incident reports. The different types of tasks may use different task templates that include field-data tracking forms having different input fields corresponding to different data objects.

Note that multiple task instances may have the same task type. For example, INSPECTIONS 1-6 may all be of the type INSPECTION. Further, note that different task instances having different task types may be carried out at the same location or different locations.

Moreover, multiple tasks may be assigned to a single field operator at the same time. For example, inspector Adam may be assigned INSPECTIONS 1, 3, and 5 that are to be performed at different locations in the refinery. When these task instances are assigned to Adam, the tracking service computer may send the task instances including corresponding blank field-data tracking forms to Adam's mobile computer. Further, Adam may travel to each of the locations to perform the different inspections and fill out each of the field-data tracking forms. Once Adam has completed the inspections and filled out the field-data tracking forms, the completed forms may be sent to the field-data tracking database computer to be stored in order to provide an object record of evidence that the locations were inspected by Adam.

FIG. 5 shows an example form building tool GUI 130. For example, the form building tool GUI 130 may be displayed at an administrator client computer to enable an administrator to create a field-data tracking form to be included in a task template. The form building tool GUI 130 may include an insert-base-object selector 500, an add-layer selector 502, an add-data-object selector 504, a define-object-attribute selector 506, and a define-interaction-rule selector 508.

The insert-base-object selector 500 may be selected to insert an unstructured object 501 as a base layer of the field-data tracking form. For example, an insert file prompt may be displayed responsive to selecting selector 500. In another example, a prompt for capturing a digital photograph may be displayed responsive to selecting selector 500. In another example, a document scanning function may be initiated responsive to selecting selector 500. An unstructured base object may be retrieved and inserted in the field-data tracking form in any suitable manner. Once the unstructured base object 501 is selected/captured, the unstructured base objet 501 may be displayed in the form building tool GUI 130 to act as a guide to form the visual layout of the field-data tracking form.

The add-layer selector 502 may be selected to create a new layer positioned on top of the unstructured base object. In one example, each time a new layer is created, the new layer may be placed below a previous layer in a stack on top of the unstructured base object. For example, layer 510 (indicated by dashed lines) may be a first layer created on top of a stack of layers 1-4. In some implementations, the add-layer selector 502 may further include functionality for creating different sections within a layer.

The add-data-object selector 504 may be selected to create a new data object in the field-data tracking form. For example, a list of different types of input fields may be displayed responsive to selecting selector 504. Example input field types may include a text field, a pick list, a digital signature, an image prompt, a file attachment prompt, and other suitable types. Once the input field type is selected, an input field 512 may be displayed in the form building tool GUI 130. The newly created input field 512 may be moved to a desired position relative to the unstructured base object, such as via a drag and drop operation. Designating the location of the input field 512 may define the position data of the data object corresponding to the input field.

The define-object-attributes selector 506 may be selected to define attributes for a selected data object. In some implementations, the attributes may be defined manually. In some implementations, a data-object type may be selected and default attributes may be defined based on the selected data-object type. In one example, a data object may be specified as being of type text field, and default attributes for the text field may include a value, a position, a timestamp, and an author. In another example, a data object may be specified as being of type image, and the default attributes for the image may include an image file location, an image file type, a photographer, and a timestamp. Any suitable attributes may be defined for a data object.

The define-interaction-rules selector 508 may be selected to define interaction rules for a specified data object, section, or layer. In one example, in the depicted implementation, the interaction rules specify that a value must be entered into all input fields in a layer before access is granted to input fields of a next layer in the stack. This means that the input fields SELECT NAME 1, TEXT INPUT 1, TEXT INPUT 2, TEXT INPUT 3, and TEXT INPUT 4 of the first layer all must be filled out before access is granted to the input fields of the second layer.

In the depicted implementation, the unstructured base object is an incident report. For example, the incident report may be a digital copy of a legacy physical form that has been approved by an administrator as complying with policies and standards. Layers are created on top of the incident report to divide the information in the incident report into logical partitions. In particular, the first layer includes information relating to a claimant involved in an incident, the second layer includes information relating to a witness of the incident, the third layer includes a digital signature of an inspector, and the fourth layer includes a digital signature of a supervisor. For example, the signatures may indicate that the inspector and the supervisor have confirmed that the information in the incident report is accurate. Moreover, the signatures may be required to maintain compliance.

Note that the input fields may be aligned with real-world counterpart text fields of the incident report so that the field-data tracking form may have the same visual layout as the physical incident report. Accordingly, the field-data tracking form may be easily adopted to replace the legacy incident report without a reduction in efficiency in collecting field data due to investigators having to learn a different visual layout.

In some implementations, the form building tool GUI may be configured to provide functionality to insert data objects from other sources into a layer or across multiple layers within a task (or push data related to a data object from a layer to another external source). For example, the form building tool GUI may enable creation of a data object that links to an external information source. In one particular example, a data object may link to a document control system in order to pull in specific portions of a procedure into a certain section of a layer. Because the data object maintains the link, any dynamic changes to the procedures may be automatically applied to the data object via the link. Moreover, any changes to procedures may be tracked as attributes of the data object in order to maintain a full audit trail of those changes and data pulled in from the external source.

In some implementations, the form building tool GUI may be configured to allow inter-application or inter-software services to input data or objects from other applications into a layer or section within a layer, or to control access to other layers or sections within a layer based on data within another application or software. For example, the form template builder 112 may define an application programming interface (API) to communicate with other applications and services installed on a field client computer. For example, information may be imported to populate a data object from a word processing application, a spread sheet application, a database application, or another suitable application.

Figure 6:
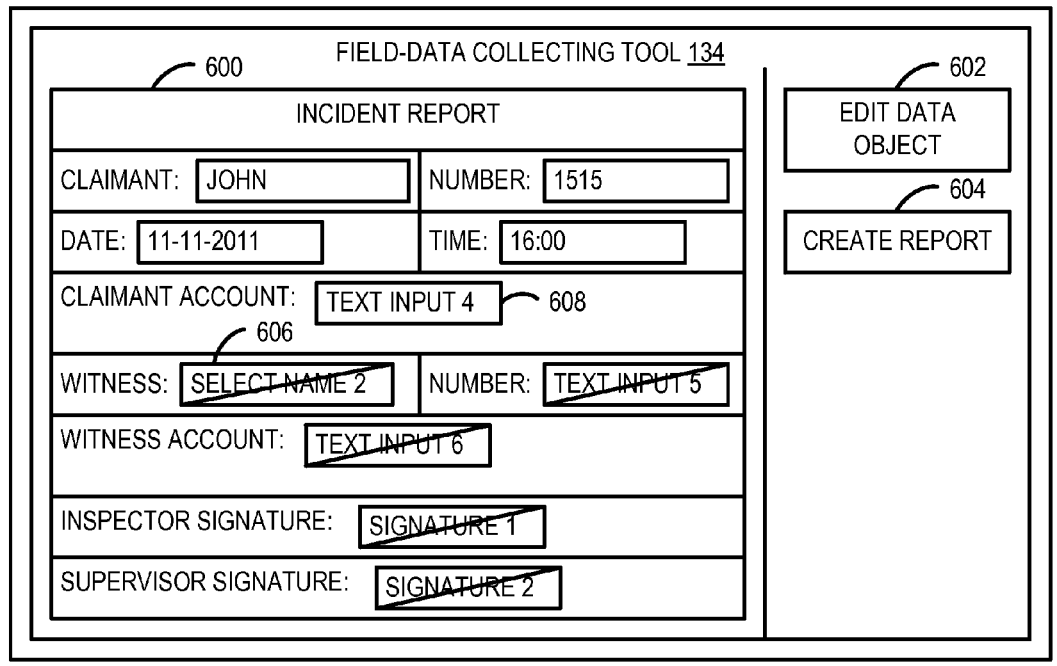
FIG. 6 shows an example field-data collecting tool GUI that includes a fixed-layout document as an unstructured base object of a field-data tracking form.

FIG. 6 shows an example field-data collecting tool GUI 134 that includes an incident report as an unstructured base object 600 of a field-data tracking form. For example, the field-data collecting tool GUI 134 may be displayed at a field client computer to enable a field operator to fill out a field-data tracking form as part of completing an assigned task instance. The field-data collecting tool GUI 134 may include an edit-data-object selector 602, and a create-report selector 604.

The edit-data-object selector 602 may be selected to provide a value to a selected input field of the field-data tracking form. By entering the value in the input field, the value may be automatically associated with the data object corresponding to the input field. The selector 502 may be used to either add a new value to a blank input field or change an existing value previously entered into the input field.

The create-report selector 604 may be selected to create a field-data tracking report in which values of data objects in the field-data tracking form are flattened onto the unstructured base object to produce a static output file. The static output file may be a read-only file in which values cannot be edited. The field-data tracking report may act as a record of a completed task or a snapshot of a state of the field-data form.

In the depicted implementation, input fields that are not allowed to be accessed based on the interaction rules defined for the incident report are shown as being crossed-out. For example, an input field 606 may be crossed out because not all input fields in the first layer (shown in FIG. 5) are filled out. In particular, a value has not been entered into an input field 608. Once a value has been entered into the input field 606, access may be granted to the input fields in the next layer corresponding to the witness information. In this way, an order of operations may be automatically complied with to maintain procedural adherence when applicable.

In some implementations, the field-data collecting tool GUI 134 may be configured to be dynamically switch back and forth between the layered data object format shown in FIG. 6 and the mobile-optimized question/answer format described above. Accordingly, an operator may be provided with flexibility in the manner in which the operator collects data.

Figure 7:
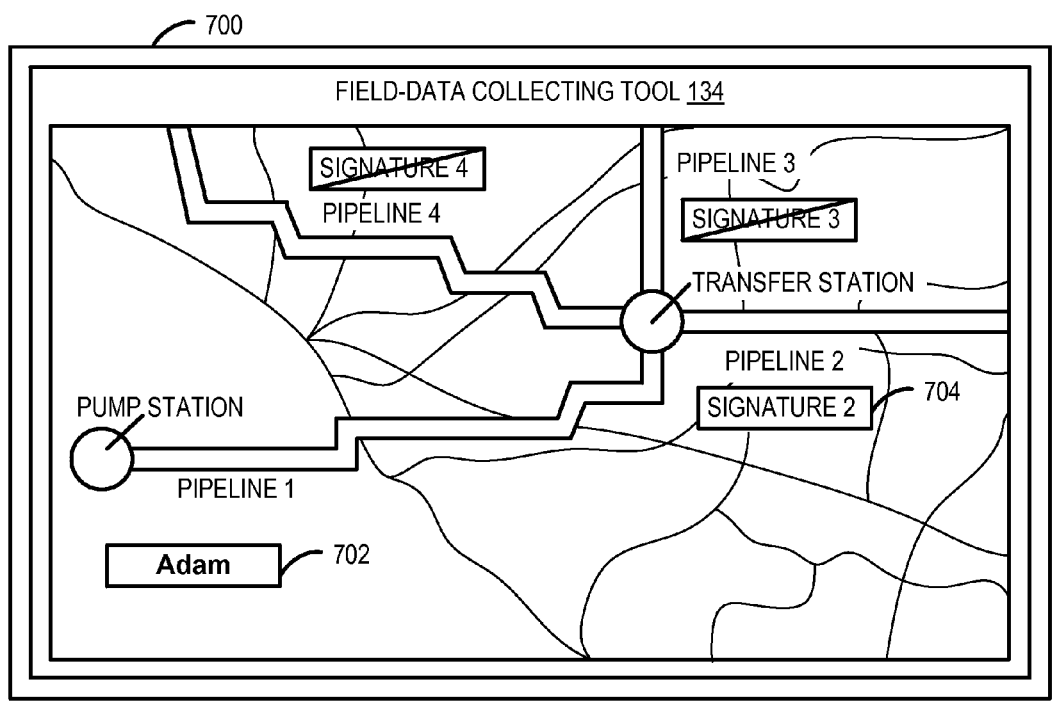
FIG. 7 shows another example field-data collecting tool GUI that includes a map as an unstructured base object of a field-data tracking form.

FIG. 7 shows another example field-data collecting tool GUI 134 that includes a map as an unstructured base object 700 of a field-data tracking form. In this implementation, each input field may be located at a designated position corresponding to a different region of interest of the map. For example, this field-data tracking form may be used to perform inspections at different locations along a LNG pipeline. Each input field may be located at a different location on the map where an inspection may be performed. In particular, when the inspector has completed an inspection of PIPELINE 1, the inspector may provide a digital signature to an input field 702 corresponding to the location at which the inspection was performed. Further, attributes generated responsive to the digital signature being entered into the input field may provide evidence that the inspection was performed. For example, a timestamp and a geographic location may be generated responsive to the digital signature being entered into the input field. These attributes may be used to confirm when and where the inspection was performed.

Furthermore, in this implementation, each input field may be included in a different layer, so that a digital signature can only be provided to one input field at a time, and access is restricted to the other blank input fields, as indicated by the other input fields being crossed-out. As each inspection is completed and the digital signature is entered into the input field for that inspection, the interaction rules may specify that access is granted to the input field positioned on the map at the location of the next inspection. For example, since a digital signature is provided to input field 702, access may be granted to input field 704 to provide a digital signature. The input field 704 may be positioned at PIPELINE 2, which is the location of the next inspection for the inspector.

Figure 8:
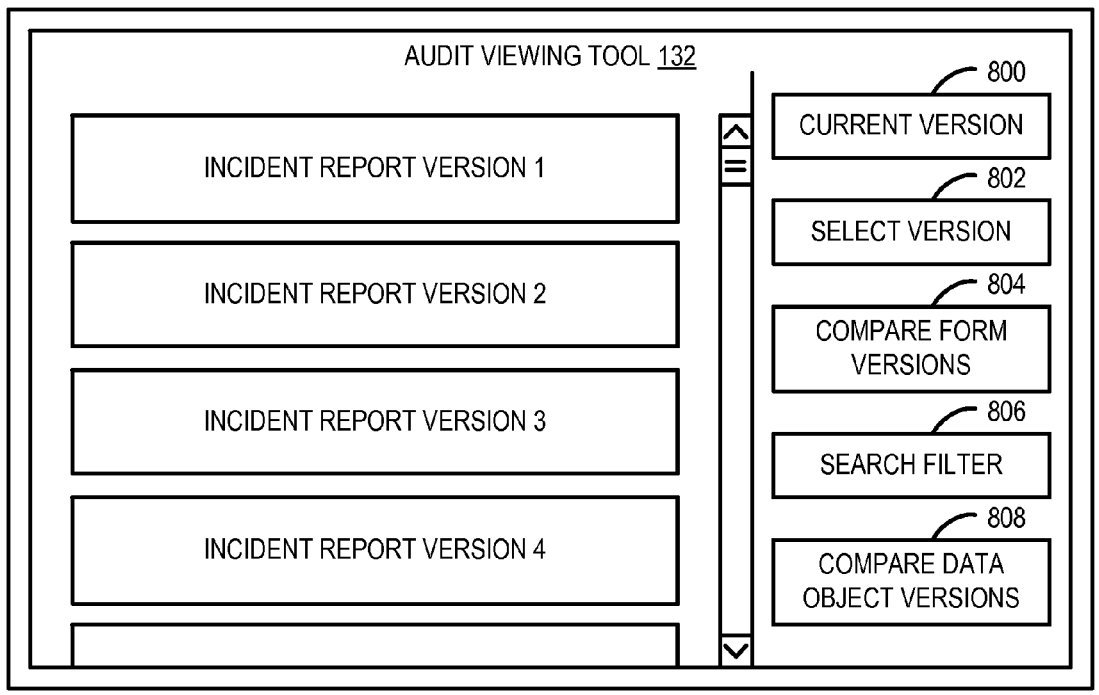
FIG. 8 shows an example audit viewing tool GUI that includes a comparison of different versions of a field-data tracking form.
Figure 9:
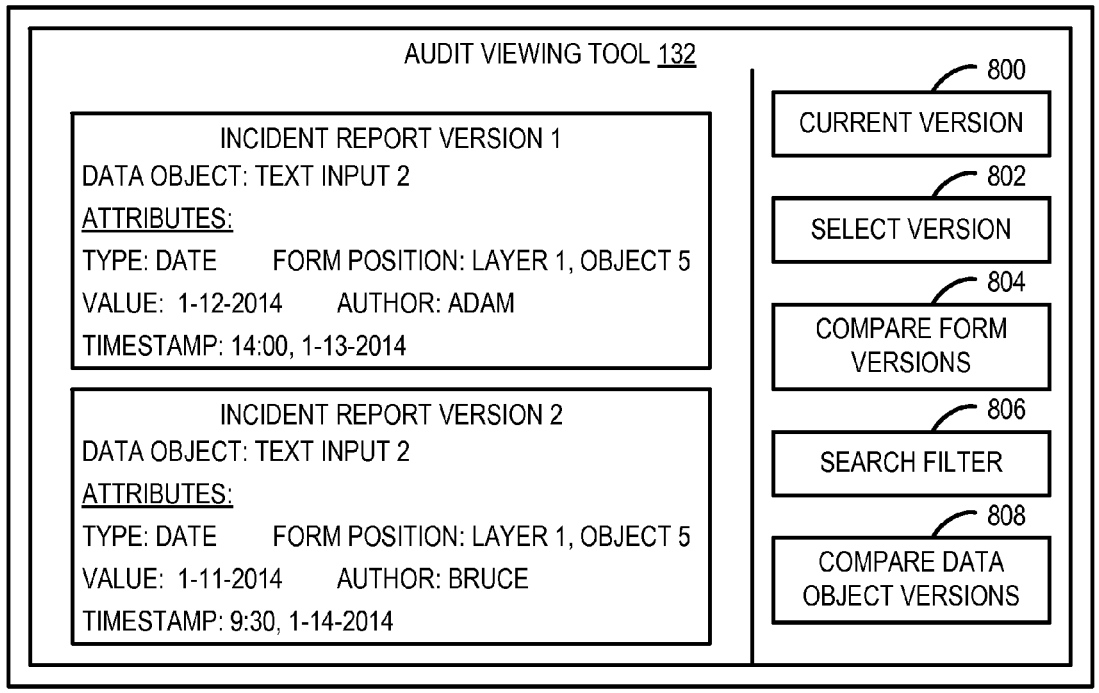
FIG. 9 shows an example audit viewing tool GUI that includes a comparison of different attributes of a discrete data object of different versions of a field-data tracking form.

FIGS. 8 and 9 show an example audit viewing tool GUI 132 that is configured to display comparisons of different versions of field-data tracking forms as well as comparisons of different versions of data objects. FIG. 8 shows a comparison of different versions of a field-data tracking form being displayed in the GUI 132. FIG. 9 shows a comparison of different versions of a data object being displayed in GUI 132. For example, the audit viewing tool GUI 132 may be displayed at an administrator client computer to enable an administrator to audit field-data tracking forms and individual data objects of various task instances. The audit viewing tool GUI 132 may include a display-current-version selector 800, a display-selected-version selector 802, a compare-selected-form-versions selector 804, a search-filter selector 806, and a compare-selected-data-object versions selector 808.

The display-current-version selector 802 may be selected to display a current version of a field-data tracking form including a plurality of data objects having most recent values entered into corresponding input fields. In some implementations, the attributes generated based on the most recent values may also be displayed in the GUI 132. In some implementations, a field-data tracking report corresponding to the current version of the field-data tracking form may be displayed responsive to selecting selector 802. The current-version selector 802 may be used by an administrator to view a state of a task instance, for example to determine whether a task has been completed.

The display-selected-version selector 802 may be selected to display a version of a field-data tracking form selected from all versions of the field data tracking form. In some implementations, a version of the field-data tracking form may be generated each time a value in the form is changed. For example, in the depicted implementation, a list of versions of the field-data tracking form may be displayed in the GUI 132, and the select-version selector 802 may be used to view any desired version of the field-data tracking form selected from the list. For example, an administrator may desire to view a particular version of the form in order to identify when an error was made in filling out the field-data tracking form.

The compare-selected-form-versions selector 804 may be selected to display two or more selected versions of the field-data tracking form in order to determine the differences between the versions. In one example, a comparison of values of data objects that changed between the two or more selected versions of the field-data tracking form may be displayed. In another example, a comparison of attributes for data objects having values that changed between the two or more selected versions of the field-data tracking form may be displayed.

The search-filter selector 806 may be selected to enter search criteria for filtering versions of the field-data tracking form and/or data objects. In other words, versions of the field-data tracking form and/or data objects that meet the search criteria may be displayed in the GUI 132. In one example, a comparison of changes made to values of data objects in different versions of the field-data tracking form that meet the search criteria may be displayed. Any suitable search criteria may be used to filter the field-data tracking forms and data objects.

In one example, the search criteria includes a designated time window in which the changes were made to the values of the data objects. Accordingly, only versions of the field-data tracking form created during the time window may be displayed. In another example, particular attributes may be used as search criteria. For example, the search criteria may include an author. Accordingly, versions of data objects having values entered by the specified author may be displayed in the GUI 132.

The compare-selected-data-object versions selector 808 may be selected to compare attributes of different versions of a selected data object. Different versions of a data object may be generated when a value of the data object changes. The attributes may differ between different versions of the data object, because the attributes may be generated based on the value of the data object. In one example, the attributes may include an author that entered a value into an input field of a field-data tracking form. Using the selector 808, an administrator may compare the author attributes for values of two different versions of a data object to determine if different field operators provided the different values. In this way, an administrator may determine who may have made an error, so that the field operator may be notified, reprimanded, trained, etc.

As shown in FIG. 9, in the depicted implementation, a comparison of different versions of a TEXT INPUT 2 data object having a type DATE may be displayed in the GUI 132. Each version of the data object may have different attributes based on the date value entered into the input field corresponding to the data object. For example, the first version of the data object may have a value 1-12-2014, a timestamp 14:00, 1-13-2104, and an author Adam. In contrast, the second version of the data object may have a value 1-11-2014, a timestamp 9:30, 1-14-2014, and an author Bruce. By displaying a comparison of attributes of different versions of a data object in the GUI 132, an administrator may easily examine the objective evidence contained in the field-data tracking form to identify the cause of an error.

It will be understood that the above described visual layout and interactive functionality of the tools and GUIs are merely exemplary, and users of the field-data tracking system may interact with such tools in any suitable manner without departing from the scope of the present disclosure.

Moreover, the above described tools may provide such functionality in any suitable manner.

Furthermore, it will be understood that use-case scenarios described in the discussion of the various tools and GUIs are merely exemplary, and the tasks and field-data tracking forms may be used to collect, track, and audit any suitable type of data associated with any suitable industry, organization, activity, or operation. For example, the field-data tracking system may be applicable to industrial applications, commercial applications, governmental applications, and other suitable applications.

Figure 10:
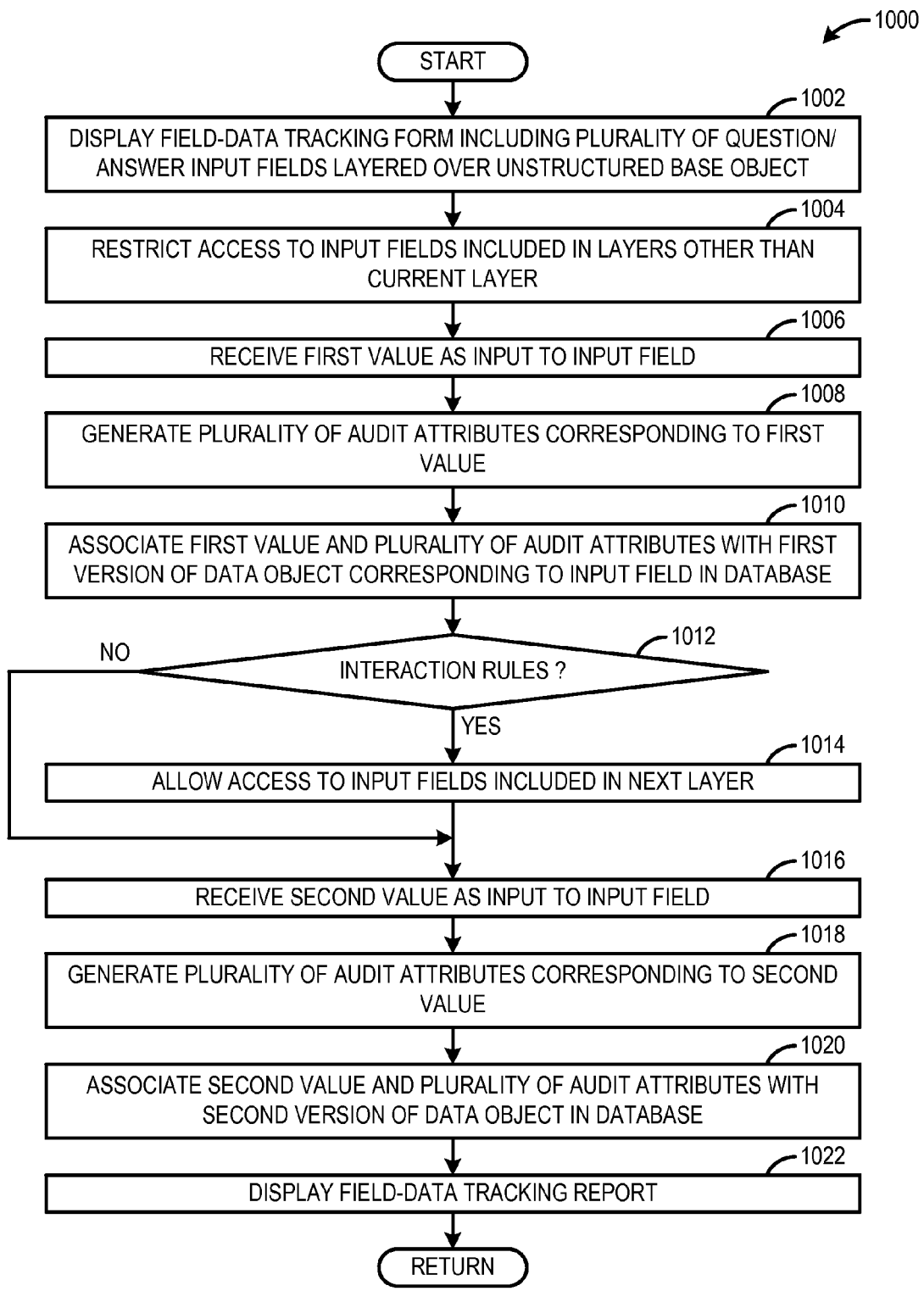
FIG. 10 shows an example method for collecting field data.

FIG. 10 shows an example method 1000 for collecting field data. For example, the method 1000 may be performed by a computer of the field-data tracking system 100 shown in FIG. 1, such as the tracking service computer 102, the field client computer 104, or the administrator client computer 106.

At 1002, the method 1000 may include displaying a field-data tracking form including a plurality of input fields visually layered over an unstructured base object. Each input field may be located at a designated position relative to the unstructured base object. In some implementations, one or more input fields may correspond to a region of interest of the unstructured base object. Each input field may correspond to a different data object. For example, the unstructured base object may include an image, a map, a diagram, a fixed-layout document, or other suitable visual element.

In some implementations, the field-data tracking form may include a plurality of layers. Each layer may include at least one data object and interaction logic that triggers access to another one of the plurality of layers based on a value entered into the input field corresponding to the at least one data object.

At 1004, the method 1000 may include restricting access to input fields included in layers other than a current layer. For example, the current layer may include a layer in which not all input fields have been filled out with a value. As another example, a current layer may include a layer in which interaction rules for the layer or data objects included in the layer have not been met.

In some implementations, one or more layers may be divided into different sections, and the method may further include restricting access to input field included in the different section of a layer other than a current section.

At 1006, the method 1000 may include receiving a first value as input to an input field of the plurality of input fields. The value may include any suitable data type including a number, a character, a text string, a document, an image, a file, a digital signature or other suitable input value.

At 1008, the method 1000 may include generating a plurality of attributes corresponding to the first value. For example, the attributes may include a timestamp indicating when the value was entered into the input field, an author that entered the value into the input field, a geographic location of the author when the value was entered into the input field, and other suitable attributes.

At 1010, the method 1000 may include associating the first value and the plurality of corresponding attributes with a first version of the data object corresponding to the input field in a database. For example, the first version of the data object may be stored as part of a task instance in the field-data tracking database computer 118 shown in FIG. 1.

At 1012, the method may include in response to receiving the first value in the input field corresponding to the data object, determining whether the interaction rules for the layer, section, and/or the data object are met. If the interaction rules are met, then the method 1000 moves to 1014. Otherwise, the interaction rules are not met, and the method 1000 moves 1016.

At 1014, the method 1000 may include allowing access to input fields included in another layer or section. In one example, access may be allowed to input fields in a next layer in a stack of layers.

At 1016, the method 1000 may include receiving a second value different than the first value as input to the input field. For example, the second value may replace the first value in the input field to correct an error, update a state of operation, or the like.

At 1018, the method 1000 may include generating a plurality of attributes corresponding to the second value that differs from the plurality of attributes corresponding to the first value.

At 1020, the method 1000 may include associating the second value and the plurality of corresponding attributes with a second version of the data object in the database. For example, the second version of the data object may be stored as part of a task instance in the field-data tracking database computer 118 shown in FIG. 1.

At 1022, the method 1000 may include displaying a field-data tracking report. In the field-data tracking report values of data objects in the field-data tracking form may be flattened onto the unstructured base object to produce a static output file that acts as a record of a completed task or a snapshot of a given state of a task.

The above described method may be performed to collect field data in the form of discrete data objects that may be parsed, stored, and audited. Moreover, the method may be performed to maintain a full traceable history of changes made to discrete data objects within a field-data form. In particular, as values within a discrete data object are changed to create different versions, the values and associated attributes of previous versions may be maintained and accessible instead of being merely overwritten.

In some implementations, the methods and processes described herein may be tied to a computing system of one or more computers. In particular, such methods and processes may be implemented as a computer-application program or service.

Figure 11:
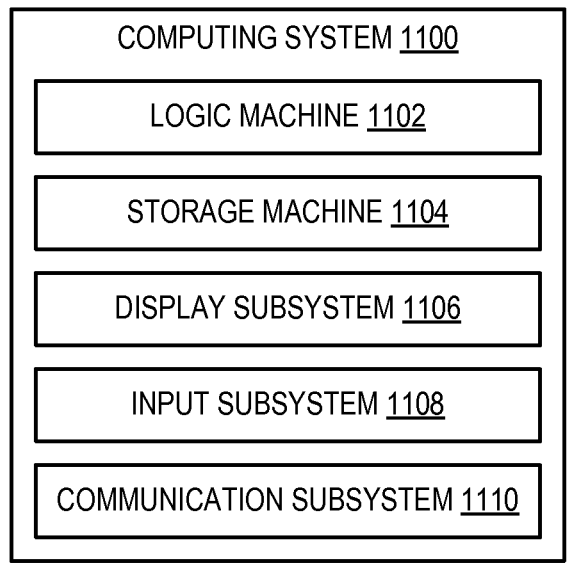
FIG. 11 shows an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. For example, computing system 1100 may be representative of tracking service computer 102, field client computer 104, administrator client computer 106, and field-data tracking database computer 118 shown in FIG. 1.

Computing system 1100 includes a logic machine 1102 and a storage machine 1104. Computing system 1100 may optionally include a display subsystem 1106, input subsystem 1108, communication subsystem 1110, and/or other components not shown in FIG. 1100.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 11104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller.

When included, communication subsystem 1110 may be configured to communicatively couple computing system 1100 with one or more other computers. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for collecting field data, comprising:
    displaying a field-data tracking form including a plurality of input fields visually layered over a map, each input field located at a designated position relative to the map and corresponding to a different location on the map, each input field corresponding to a different data object;
    receiving a first value as input to an input field of the plurality of input fields;
    generating a plurality of attributes corresponding to the first value;
    associating the first value and the plurality of corresponding attributes with a first version of the data object corresponding to the input field in a database;
    receiving a second value different than the first value as input to the input field;
    generating a plurality of attributes corresponding to the second value that differs from the plurality of attributes corresponding to the first value;
    associating the second value and the plurality of corresponding attributes with a second version of the data object in the database;
    restricting access to input fields included in layers other than a current layer; and
    in response to receiving a value in an input field corresponding to a data object included in the current layer that meets interaction rules for the current layer, allowing access to input fields included in another layer,
    wherein the field-data tracking form includes a plurality of layers, each layer including at least one data object and interaction logic that triggers access to another one of the plurality of layers based on a value entered into the input field corresponding to the at least one data object; and
    wherein the interaction rules specify that the values in each input field corresponding to the one or more data objects included in the current layer must be received while the field-data collecting client computer is located at a designated geographic location associated with each of the one or more data objects in order to allow access to another layer.

2. The method of claim 1, wherein the interaction rules also specify that the values in each input field corresponding to the one or more data objects included in the current layer must be received by a designated person in order to allow access to another layer.

3. The method of claim 1, wherein the plurality of attributes corresponding to the first value and the second value include a timestamp indicating when the value was entered into the input field, an author that entered the value into the input field, and a geographic location where the value was entered into the input field.

4. A field-data collecting client computer comprising:
    a logic machine; and
    a storage machine configured to hold instructions executable by the logic machine to:
        display a field-data tracking form including a plurality of layers visually overlaid on an unstructured base object, each layer including one or more data objects, each data object corresponding to an input field located at a designated position relative to the unstructured base object,
        restrict access to input fields included in layers other than a current layer; and
        in response to receiving a value in each input field corresponding to the one or more data objects included in the current layer that meets interaction rules for the current layer, allow access to input fields included in another layer of the plurality of layers of the field-data tracking form,
    wherein the interaction rules specify that the values in each input field corresponding to the one or more data objects included in the current layer must be received while the field-data collecting client computer is located at a designated geographic location associated with each of the one or more data objects in order to allow access to another layer.

5. The field-data collecting client computer of claim 4, wherein the interaction rules also specify that the values in each input field corresponding to the one or more data objects included in the current layer must be received by a designated person in order to allow access to another layer.

6. The field-data collecting client computer of claim 4, wherein the unstructured base object is selected from an image, a map, a diagram, and a fixed-layout document.

7. A method for collecting field data, comprising:
    displaying a field-data tracking form including a plurality of layers visually overlaid on an unstructured base object, each layer including one or more data objects, each data object corresponding to an input field located at a designated position relative to the unstructured base object, restricting access to input fields included in layers other than a current layer; and in response to receiving a value in each input field corresponding to the one or more data objects included in the current layer that meets interaction rules for the current layer, allowing access to input fields included in another layer of the plurality of layers of the field-data tracking form, wherein the interaction rules specify that the values in each input field corresponding to the one or more data objects included in the current layer must be received while the field-data collecting client computer is located at a designated geographic location associated with each of the one or more data objects in order to allow access to another layer.

8. The method of claim 7, wherein the interaction rules also specify that the values in each input field corresponding to the one or more data objects included in the current layer must be received by a designated person in order to allow access to another layer.

9. The method of claim 7, wherein the unstructured base object is selected from an image, a map, a diagram, and a fixed-layout document.

* * * * *